United States Patent
Davis et al.

(10) Patent No.: US 6,403,949 B1
(45) Date of Patent: Jun. 11, 2002

(54) METHOD AND APPARATUS FOR CORRECTING SYSTEMATIC ERROR IN A WAVELENGTH MEASURING DEVICE

(75) Inventors: Michael A. Davis, Glastonbury; David R. Fournier, Ashford; David G. Bellemore, Woodbury, all of CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/448,003

(22) Filed: Nov. 23, 1999

(51) Int. Cl.[7] .................................................. G01B 9/10
(52) U.S. Cl. .............................. 250/227.27; 356/35.5; 374/170
(58) Field of Search ............... 250/227.14, 227.18, 250/227.19, 227.23, 227.27; 356/35.5, 345, 352; 385/12, 37; 374/170, 183, 184

(56) References Cited

U.S. PATENT DOCUMENTS

| | | | |
|---|---|---|---|
| 4,065,715 A | 12/1977 | Jaffe et al. | 374/184 |
| 4,121,461 A | 10/1978 | Butler et al. | 374/171 |
| 4,315,413 A | 2/1982 | Baker | |
| 4,488,823 A | 12/1984 | Baker | |
| 4,765,184 A | 8/1988 | Delatorre | 327/362 |
| 4,841,458 A | 6/1989 | Levine et al. | 374/184 |
| 4,872,124 A | 10/1989 | Shimizu et al. | 327/513 |
| 4,939,395 A | 7/1990 | Asano et al. | 327/513 |
| 5,042,898 A | 8/1991 | Morey et al. | |
| 5,046,859 A | 9/1991 | Yamaguchi | 374/185 |
| 5,255,975 A | 10/1993 | Adams | |
| 5,469,520 A | 11/1995 | Morey et al. | |
| 5,691,999 A | 11/1997 | Ball et al. | |
| 5,838,437 A | 11/1998 | Miller et al. | 356/345 |
| 5,862,170 A | 1/1999 | Britton, Jr. et al. | 374/184 |
| 5,877,426 A | 3/1999 | Hay et al. | |
| 5,892,582 A * | 4/1999 | Bao et al. | 250/227.27 |
| 6,217,211 B1 | 4/2001 | Hesky | 374/184 |

FOREIGN PATENT DOCUMENTS

| | | | |
|---|---|---|---|
| DE | 205524 | 12/1983 | 374/183 |
| EP | 892250 A1 | 1/1999 | |
| GB | 2269230 A | 2/1994 | |
| JP | 59225324 | 12/1984 | |
| SU | 1506297 | 9/1989 | 374/183 |
| SU | 1560989 | 4/1990 | 374/183 |
| WO | WO 98/36252 | 8/1998 | |

OTHER PUBLICATIONS

Song, E.A., "Simultaneous Measurement of Temperature and Strain Using Two Fiber Bragg Gratings Embedded in a Glass Tube", Optical Fiber Technology, US, Academic Press, London, vol. 3, No. 2, Apr. 1, 1997, ISSN: 1068–5200 (whole document).

(List continued on next page.)

*Primary Examiner*—Stephone Allen
(74) *Attorney, Agent, or Firm*—Ware, Fressola, Van Der Sluys & Adolphson LLP

(57) ABSTRACT

A method and apparatus for compensating for systematic error in a wavelength measuring device that provides values for the wavelengths reflected from one or more optical fibers in which fiber Bragg gratings (FBGs) serve as sensors. A high-precision temperature sensing and measuring circuit is used to measure the temperature of a reference FBG that also provides light at some wavelength to the wavelength measuring device. The wavelength reflected by the reference FBG changes with temperature in a way that is known. The (value of) the wavelength being reflected from the reference FBG is then provided to a dynamic compensator, which also receives the wavelengths of light reflected from the sensor FBGs, and the dynamic compensator adjusts the wavelengths of the sensor FBGs using a correction based on the correction required to adjust the value of the wavelength of the reference FBG as measured by the wavelength measuring device.

24 Claims, 7 Drawing Sheets

OTHER PUBLICATIONS

Patent Abstract of Japan, "Electronic Thermometer", vol. 009, No. 101 (P–353), May 2, 1985.

T. Hammon, et al, A Temperature Compensated Optical Fibre Bragg Grating Band Rejection Filter and Wavelength Reference, Technical Digest. Optoelectronics and Communications Conference. Jul. 1996.

"Applications of Optical Fiber Bragg Grating Sensors for the Seismic Industry" printed by ciDRA Corp., May 1998, pp. 1–12.

* cited by examiner

METHOD AND APPARATUS FOR CORRECTING SYSTEMATIC ERROR IN A WAVELENGTH MEASURING DEVICE

CROSS-REFERENCE TO RELATED APPLICATIONS

This patent application is related to and co-filed with patent applications identified by U.S. patent application Ser. No. 09/447,483 filed Nov. 23, 1999 (WFVA/CiDRA Ref Nos. 712-2-60/CC-0178) and U.S. patent application Ser. No. 09/448,367 filed Nov. 23, 1999 (WFVA/CiDRA Ref Nos. 712-2-76/CC-0219), both hereby incorporated by reference in their entirety.

FIELD OF THE INVENTION

The present invention pertains to the field of measuring wavelengths in a spectrum of light. More particularly, the present invention pertains to a method and corresponding apparatus for correcting systematic error in a wavelength measuring device.

BACKGROUND OF THE INVENTION

The use of Fiber Bragg grating (FBG) devices in telecommunications sensing has driven the requirements for very accurate measurements to be made on the center wavelengths of these devices, often down to $10^{-12}$ meters. Various instruments today are able to provide highly accurate readings of FBGs, especially when the FBGs function in a reflective mode. However, currently, many of these instruments cannot provide accuracies down to the $10^{-12}$ meters often required. What stands in the way are various errors associated with the instruments, some because of how the instruments are affected by the environmental conditions in which the instrument is used, including the ambient temperature, or because of aging of the instruments. Some of these errors are systematic, so that the instrument makes the same error in reading any FBG.

For example, as shown in FIG. 1, one method often used to measure FBG reflected wavelengths utilizes a scanning Michelson interferometer as a component of a wavelength measuring device. Such a method measures interferometric fringes that vary in frequency depending on the wavelength of light entering the interferometer, allowing a determination of the wavelength of the light, but also depending on the rate of the interferometric scan; the variation caused by the changes in the scan rate are a source of systematic error in the determination of the wavelength of the light. A Fourier transform of the output of the interferometer, i.e. the fringe pattern produced by the interferometer, is then made to characterize (in terms of frequency or wavelength components) the light entering the interferometer. In other words, by determining a Fourier transform of the output of the interferometer, the wavelength of light reflected from a FBG can be determined.

As shown in FIG. 1, light reflected from a reference laser, and so having a peak at an approximately known wavelength (the wavelength varies somewhat depending on ambient conditions such as temperature), is sometimes used to subtract the systematic error caused by changes in the scan rate of the interferometer, as well as the systematic error caused by other factors, including ambient temperature.

Using a reference laser can provide an accurate measurement of the wavelengths of light reflected from sensing FBGs by an interferometer, or more generally a wavelength measuring device, but only if the wavelength of light from the reference laser is known. A change by an unknown amount in the wavelength of the light from a reference laser (because of a change in temperature, for example) will produce an error that will be systematic, i.e. that will occur in the wavelength determination for each peak in a scanned spectrum, but which cannot be corrected, because the error is unknown. To correct systematic error, the magnitude of the systematic error must be determined. Even a very small change in temperature of a reference laser, as little as 0.007° C., can cause an unacceptably large change in the wavelength of light from the reference laser.

What is needed is a way of compensating for systematic error in a wavelength measuring device, such as a device that includes a Michaelson interferometer, the compensating based on taking into account what the wavelength measuring device measures to be the wavelength of light provided by a reference device, not necessarily a laser, and doing so in a way where the wavelength of the reference light is in fact known with great precision, and in particular is known to a precision that distinguishes changes in the reference wavelength caused by changes in the temperature of the reference device by as little as 0.007° C.

SUMMARY OF THE INVENTION

Accordingly, the present invention provides an apparatus for compensating for systematic error in wavelength measurements provided by a wavelength measuring device used for measuring the wavelengths of peaks in a spectrum of light, including light reflected from a reference fiber Bragg grating (FBG), the apparatus including a temperature sensing and measuring circuit and a dynamic compensator. The temperature sensing and measuring circuit is for measuring the temperature to which the reference FBG is exposed. It is responsive to the temperature, and provides a signal indicative of the temperature. The dynamic compensator is responsive to the wavelength measurement signals from the wavelength measuring device, responsive to the signal indicative of the temperature of the reference FBG, and further responsive to a signal indicating a correlation of the true wavelength of light reflected from the reference FBG and the temperature of the reference FBG. It provides dynamic compensator signals indicating information about compensated wavelength measurements.

In one aspect of the invention, the information about compensated wavelength measurements is based on the difference between the true wavelength of light reflected from the reference FBG for the measured temperature of the reference FBG, and the measured wavelength of light reflected from the reference FBG.

In another aspect of the invention, the temperature sensing and measuring circuit includes: a switched sensing circuit having a common set of electrical components and two different electrical components, responsive to the temperature to which the reference FBG is exposed, and further responsive to a detection circuit switch control signal, for providing switched sensing circuit signals containing information about an operating characteristic of the switched sensing circuit using the common set of electrical components switched respectively through each of the two different electrical components; and a detection circuit, for providing the detection circuit switch control signal, and responsive to the switched sensing circuit signals, for providing a detection circuit signal containing information about the temperature to which the reference FBG is exposed. In some applications of this aspect of the invention, the common set of electrical components includes a capacitor connected in series with a multi-pole switch, and the operating characteristic is a time to charge or discharge the capacitor.

From another perspective, the present invention includes: a wavelength measuring device, responsive to a light signal having a spectrum including a peak at a wavelength of light reflected from a reference fiber Bragg grating (FBG) exposed to a temperature, for providing a signal indicating a measurement of the wavelength of the peak; and a compensating circuit, responsive to the signal indicating the wavelength measurement, and responsive to the temperature to which the reference FBG is exposed, for providing signals indicating values for other wavelength measurements compensated for systematic error made by the wavelength measuring device.

The method of the invention comprises the steps of: enclosing the reference FBG so as to see substantially a uniform temperature; measuring the temperature; determining the true wavelength of a peak of light reflected by the reference FBG based on the measured temperature and a pre-determined correlation between temperature of the reference FBG and a wavelength of a peak of light reflected by the reference FBG; acquiring the measured wavelength of the peak of light reflected by the reference FBG; and determining a correction to be used to compensate the wavelength measuring device for systematic error based on the difference between the measured wavelength of the peak of light reflected from the reference FBG and the true wavelength of the peak of light reflected from the reference FBG.

In a particular aspect of the method of the invention, the temperature of the reference FBG is measured using a thermistor disposed so as to sense substantially the same temperature as the reference FBG. In addition, a fixed resistor is used, one substantially insensitive to temperature, and the temperature of the reference FBG is measured based on operating characteristics of a circuit involving the thermistor and, in turn, the reference resistor by switching into the circuit the thermistor and, in turn, the reference resistor, but keeping substantially all other components in the circuit exactly the same.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
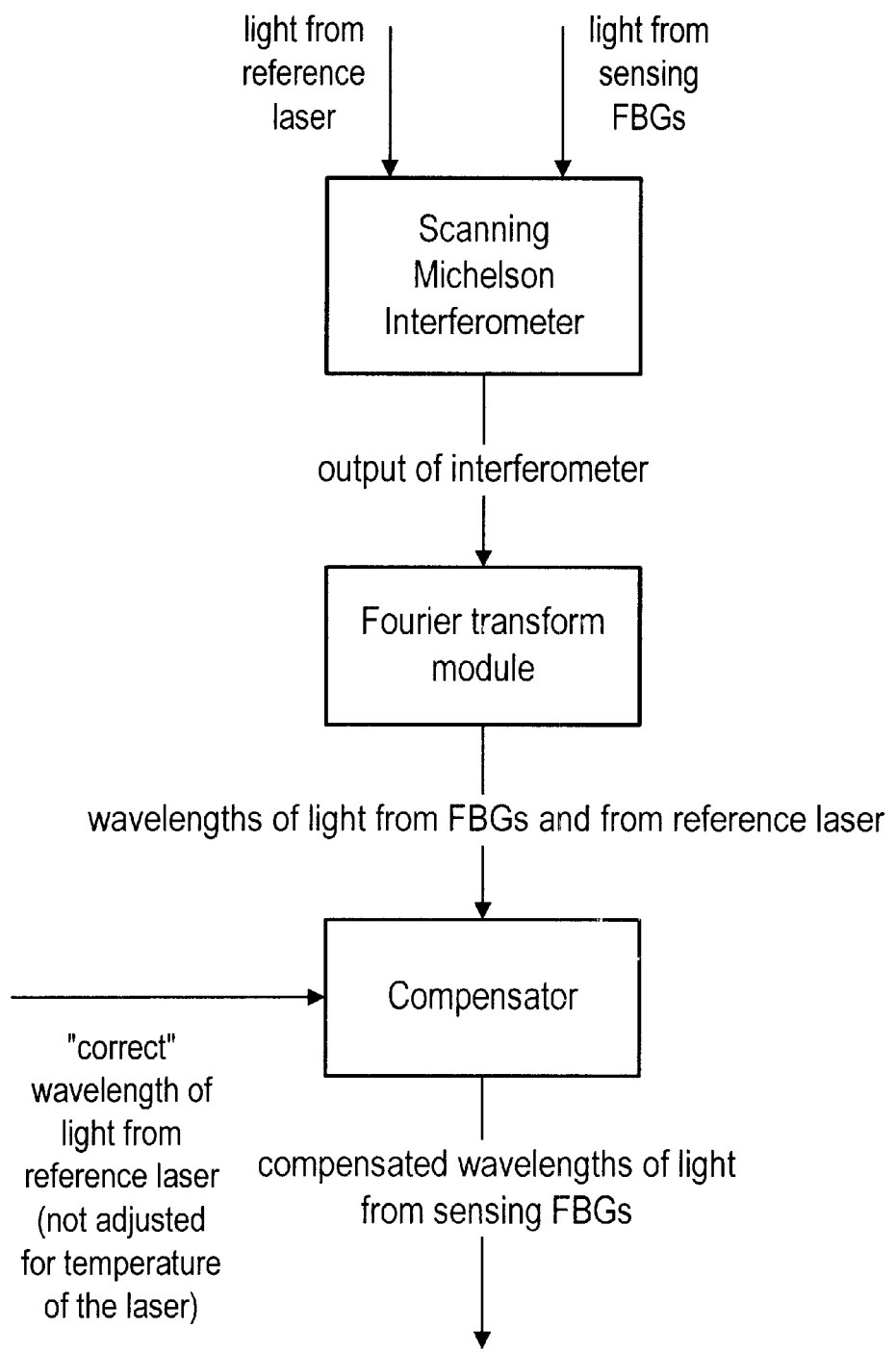
FIG. 1 is a block diagram/flow diagram showing the use of a reference FBG in compensating a scanning Michelson interferometer, according to the prior art.
Figure 2A:
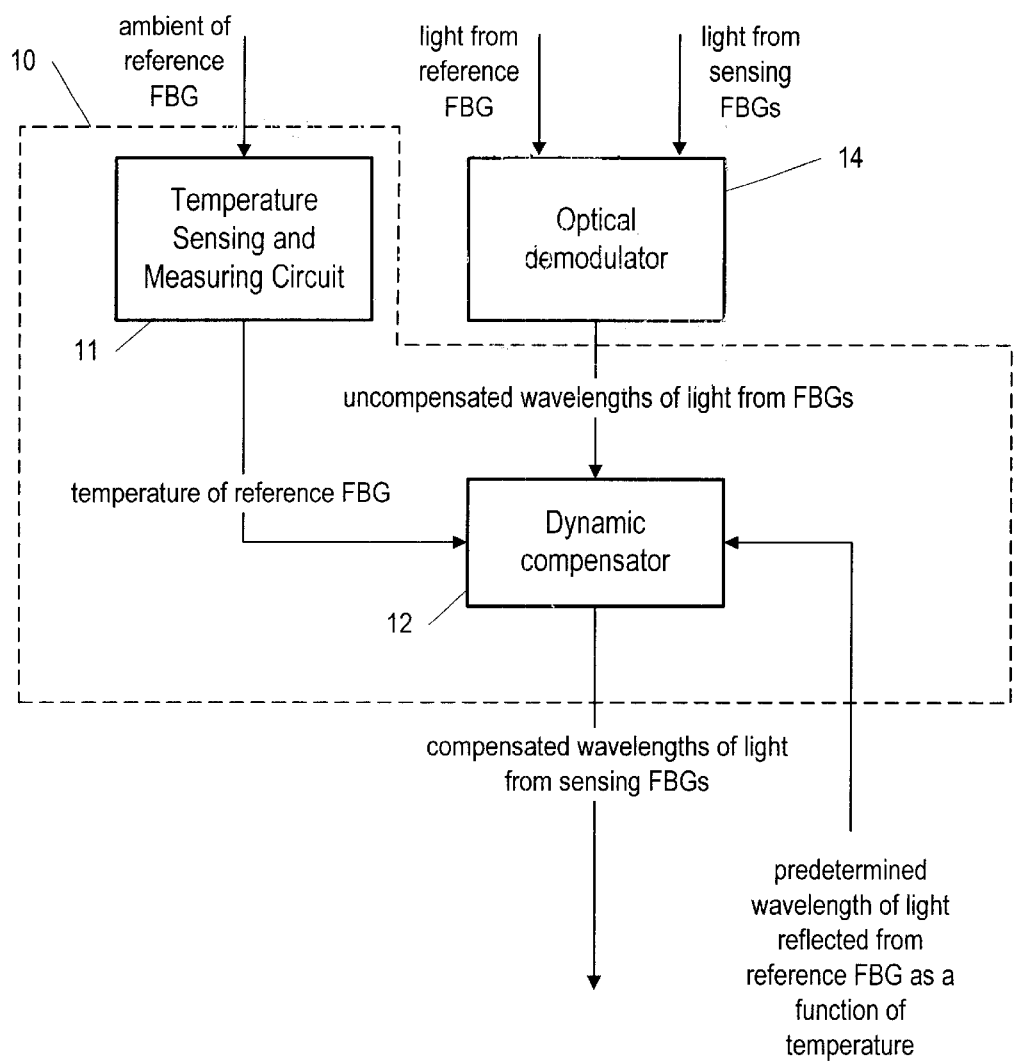
FIG. 2A is block diagram/flow diagram showing the use of a reference FBG in compensating a wavelength measuring device, according to the present invention.

Referring now to FIG. 2A, an optical demodulator 14, as an example of a wavelength measuring device, is shown being compensated for systematic error caused by, for example, changes in temperature or changes in operating parameters (such as scan rate), by an apparatus 10, according to the present invention, including a temperature sensing and measuring circuit 11 and a dynamic compensator 12. The optical demodulator receives, as inputs, light both from a reference fiber Bragg grating 206b (see FIG. 6), and light from sensing fiber Bragg gratings 108, 110, 112 (see FIG. 6) used for example to sense ambient conditions such as temperature or pressure, based on the wavelength of the light reflected from the sensing fiber Bragg gratings. The temperature and measuring circuit 11 is a high-precision (high repeatability), high accuracy (yielding a correct value) device, that senses the ambient conditions to which the reference fiber Bragg grating (not shown) is exposed by using a thermistor, or other resistance-based sensing component, in close proximity to the reference FBG; it determines the temperature of the reference fiber Bragg grating (i.e. the temperature seen by the thermistor) to within 0.007° C. The dynamic compensator 12 has as one input a pre-determined correlation with temperature of the wavelength of light reflected from the reference fiber Bragg grating. In other words, the dynamic compensator is provided with data from which it can determine what wavelength is in fact reflected from the reference fiber Bragg grating, given the temperature of the grating; that wavelength is here called the true wavelength.

The dynamic compensator 12 then uses the measured temperature of the reference fiber Bragg grating and the pre-determined temperature-wavelength correlation for the reference fiber Bragg grating, along with the uncompensated wavelength of light determined by the optical demodulator 14 to determine a correction, such as the difference in the uncompensated reference wavelength and the true wavelength, which it then applies to each other wavelength (i.e. wavelengths from the sensor fiber Bragg gratings), to provide compensated values for each such other wavelength.

It should be clear that the present invention is not restricted to having the dynamic compensator 12 provide actual compensated wavelength measurements. The dynamic compensator 12 can, just as advantageously, provide the amount by which to compensate wavelength measurements performed by the optical demodulator 14, and the actual compensation can then be performed by some other component (not shown).

The dynamic compensator 12 can be implemented using a typical microprocessor-based architecture, including a microprocessor, a Random Access memory (RAM), a Read Only Memory (ROM), input/output devices, and a bus for providing data and control signals therebetween. The scope of the invention is not intended to be limited to any particular software embodiment, or only a software embodiment, because embodiments are envisioned using hardware or a combination of software and hardware. One of ordinary skill in the art of signal processing and software engineering will appreciate that there are many advantageous ways of implementing the dynamic compensator 12 of the present invention so as to achieve the functionality herein described.

In the preferred embodiment, the temperature sensing and measuring circuit 11 measures the value of the resistance of a thermistor used in a discharge circuit, i.e. a circuit in which a capacitor charges or discharges through the thermistor, the (variable) rate of charging or discharging depending on the product $R_T C_D$ of the capacitance $C_D$ of the capacitor and the resistance $R_T$ of the thermistor, and so changing with the value of the resistance $R_T$ of the resistor, which itself changes with temperature in a known way. But in addition, in the preferred embodiment, the temperature sensing and measuring circuit is a so-called common-component circuit in that it also uses a reference resistor, alternating in the circuit with the thermistor, a reference resistor having a known resistance and substantially unaffected by temperature. In this alternating use of the thermistor and reference resistor, all other components are kept exactly the same; such a circuit is here called a common-component circuit. The use of a common-component circuit to measure temperature with both high precision and high accuracy is shown and described in the aforementioned cross-referenced patent applications, and further described below.

Figure 2B:
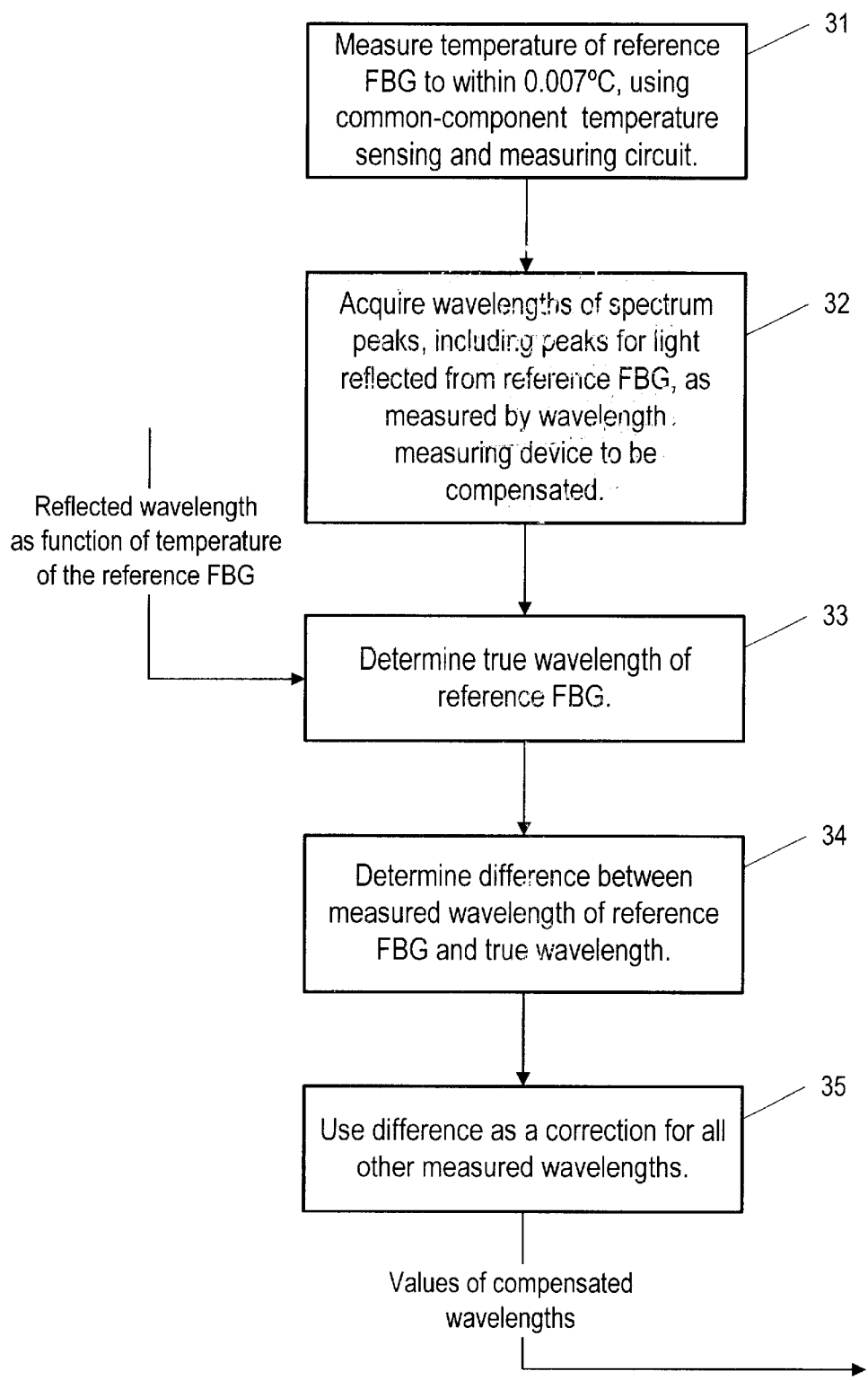
FIG. 2B is a flow diagram showing the method of the present invention.

Referring now to FIG. 2B, a method of compensating for systematic error in a wavelength measuring device is shown as including a first step 31 in which the temperature of a reference FBG is measured, precisely and accurately, using a common-component temperature sensing and measuring circuit as described below. Next, in a step 32, the wavelengths of peaks in a spectrum, as measured by the wavelength measuring device to be compensated, are acquired. The spectrum includes light reflected both from the reference FBG as well as from sensing FBGs. Then in a step 33, the true wavelength of the light being reflected is determined based on the temperature of the reference FBG as measured in step 31, and based upon a known dependence of the wavelength of light reflected from the reference FBG and its temperature. Then in a step 34, the difference is determined between what the wavelength measuring device measured as the wavelength of the light reflected from the reference FBG and its true value. With this difference used as a correction, in a next step 35, each of the wavelengths of the other peaks in the spectrum are adjusted to eliminate the systematic error in the wavelength measuring device, and the values of the compensated wavelengths are thus determined.

Figure 3:
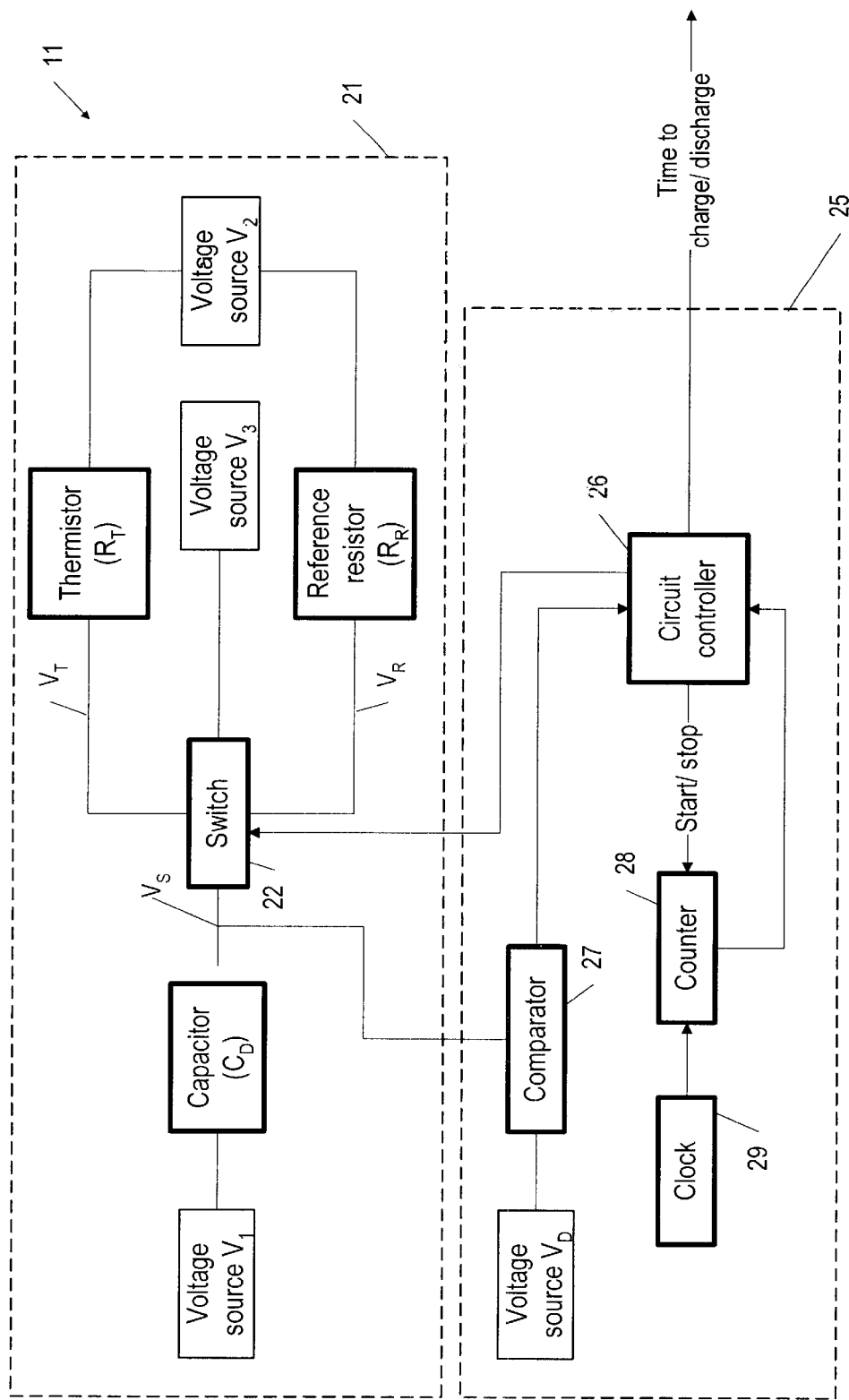
FIG. 3 is a block diagram of a circuit for measuring the temperature of a reference fiber Bragg grating as part of the present invention.

Referring now to FIG. 3, an apparatus 11 for performing a temperature measurement according to the present invention is shown as including a discharge circuit 21 and a detection circuit 25. The discharge circuit 21 includes a capacitor having one terminal held at a voltage $V_1$, and having the other terminal connected through a multi-pole switch 22 to one or another path to ground. By use of the switch 22, the capacitor $C_D$ is either able to charge (or discharge) through either a thermistor $R_T$ or a reference resistor $R_R$, or discharge (or charge) by connection to a voltage source $V_3$. Thus, for example, when the discharge circuit is used to measure the time for the capacitor to discharge (as opposed to measuring the time to charge), the capacitor would first be charged by using the switch 22 to bring the voltage source $V_3$ into the circuit (and thus cause the directly connected terminal of the capacitor $C_D$ to see the voltage $V_3$); the switch is next used to connect the capacitor $C_D$ to the reference resistor $R_R$ through which the capacitor sees a voltage $V_2$ less than $V_3$, such as ground, and the time is measured for the capacitor to discharge to some level, as described below. The charging is then repeated and the time is then measured for the capacitor to discharge with the thermistor switched into the circuit in place of reference resistor. The switch 22 permits the use of the same capacitor $C_D$ and same detection circuit 25 for measurement of either the resistance $R_R$ or the resistance $R_T$ (by measurement of the time for either charging or discharging through the resistances). Knowing the time $t_T$ for discharging below the threshold for the thermistor, the time $t_R$ for discharging below the threshold for the reference resistor, and knowing the value $R_R$ of the reference resistor, allows an evaluation of the thermistor resistance $R_T$, according to the equation, $$R_T = \frac{t_T}{t_R} R_R. \qquad (1)$$

Thus, when the discharge circuit is used based on measuring the time to discharge, the charge on the capacitor $C_D$ is determined by the difference between a first set voltage $V_1$, applied at one terminal of the capacitor, and a second set voltage $V_3$ applied to the other, second terminal of the capacitor, the second voltage being applied through a connection provided by the switch 22. Then the capacitor is discharged through either the thermistor or reference resistor, the connection to either one or the other being made by the switch 22, so as to have a third set voltage $V_2$ as the final voltage of its second terminal, but so as to have either voltage $V_R(t)$ or voltage $V_T(t)$ at its second terminal while it is discharging.

As the capacitor discharges, the voltage $V_S$ on the switch side of the capacitor, which is either the voltage $V_R$ or $V_S$ depending on whether the thermistor or fixed resistor is switched into the circuit, decreases over time, (to $V_2$ which is either ground potential or some other voltage lower than $V_3$), because current flows through the switch 22 to the other terminal of the capacitor, removing the charge on the capacitor. A circuit controller 26, shown as part of the detection circuit 25, uses the switch 22 to select one or the other of the two resistances $R_R$ or $R_T$, or the voltage $V_3$.

Still referring to FIG. 3, a detection threshold voltage $V_D$ is applied to one input of a comparator 27, and the voltage $V_S$ is applied to the other input, so that the comparator 27 produces a detection pulse whenever the voltage $V_S$ drops below $V_D$. The detection pulse is then used to stop a counter 28 (through a command sent by the circuit controller 28 as described below) after being started by circuit controller 26 when the switch is first thrown so as to put the thermistor or the fixed resistor in a complete (series) circuit with the capacitor $C_D$ after the capacitor is charged. The counter 28 provides an estimate, in clock cycles, of the duration of the detection circuit voltage pulse 13, 14. In providing the estimate, the counter 28 uses a clock 29 that in the preferred mode is a high frequency clock.

Thus, the circuit controller 26, besides controlling the switch 22 by providing a control signal as a control output, starts and stops the counter 28, using the output of the comparator 27 as an input, based on the input from the comparator and based on the final counter values for the reference resistor $R_R$ and the thermistor $R_T$, whichever is at the time being measured, i.e. it waits until the counter is done counting before throwing the switch. In the preferred embodiment, the counter throws the switch at some predetermined time after the counter is done counting, but the counter can also be configured to throw the switch at predetermined constant-length intervals, of appropriate length so that the counter would always finish counting during an interval.

As already indicated, the temperature measuring circuit of FIG. 3 can also be used to determine temperature not by discharging the capacitor C, but by charging it, since the time constant for charging it is the same as for discharging it, i.e. the time constant is RC in both cases, and the voltage across the capacitor either increases or decreases according to an equation having the time dependence $e^{-t/RC}$.

Still referring to FIG. 3, the circuit controller 26 also provides, as output of the detection circuit 25, the values determined by the counter 28, which correspond to the times $t_T$ and $t_R$ of equation 1. In the preferred embodiment, a separate microprocessor (part of computer/display 226 of FIG. 6) uses the counter values provided by the circuit controller 26, and the known value $R_R$ of the fixed resistor, to provide a value $R_T$ for the thermistor according to equation 1, and then uses a description of how $R_T$ varies with temperature to infer the temperature being measured.

The circuit controller 26 could be any of a number of different devices, including a micro-controller, programmable gate arrays, or different combinations of different discrete components.

Figure 4:
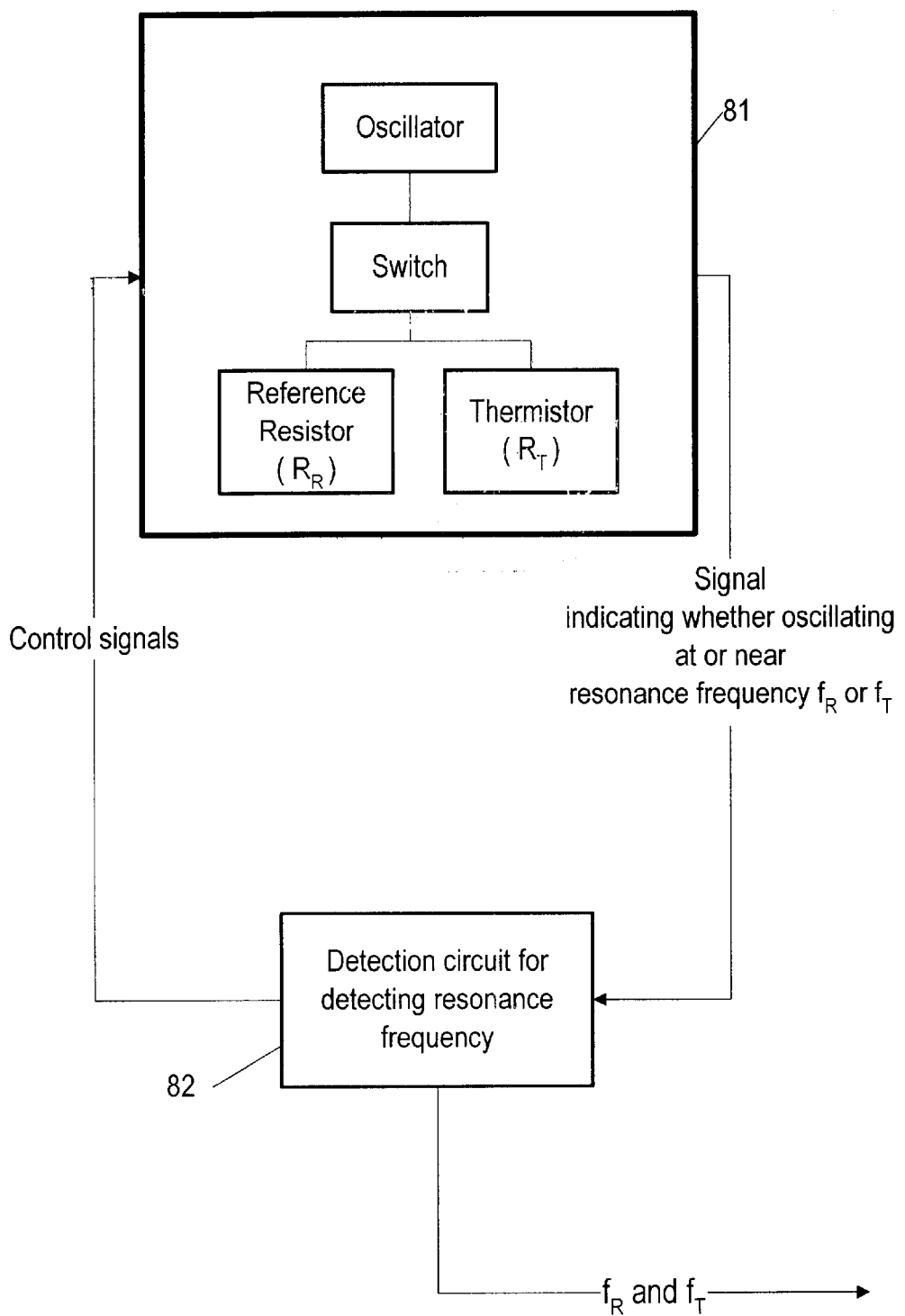
FIG. 4 is a flow diagram indicating the operation of another circuit for measuring the temperature of a reference fiber Bragg grating as part of the present invention.

Referring now to FIG. 4, in another embodiment of the present invention, a thermistor resistance, and in turn a fixed resistance, are converted into a time varying signal by including a thermistor and in turn a fixed resistor as part of a sensing circuit that is a resistance-tuneable oscillating circuit 81, such as an operational amplifier-based tuneable RC oscillator circuit. In such an implementation, the temperature and therefore the resistance of the thermistor or fixed resistor cause the oscillator frequency to change. A detection circuit 82 for detecting resonance frequency is then used to determine the oscillator resonance frequency with either the thermistor or fixed resistor, the detection relying on a parameter indicating whether the oscillating circuit is oscillating at or near resonance, and using control signals to search for resonance (which might include voltage pulses at a frequency estimated to be the resonance frequency). The parameter is often the amplitude of the time-varying voltage between two points in the sensing circuit. The thermistor resistance can then be determined from the fixed resistance and the ratio $f_T/f_R$ of thermistor and fixed resistor frequencies, based on an equation similar to equation 1, namely, $$R_T = F\left(\frac{f_T}{f_R}\right) R_R, \qquad (2)$$

where F is some function depending only on the ratio of the measured frequencies, which could be an inverse relationship or other non-linear relationship. Once $R_T$ is thus determined, the temperature being measured can be inferred from the known way in which the thermistor resistance varies with temperature (in the same way as in the preferred embodiment).

Figure 5:
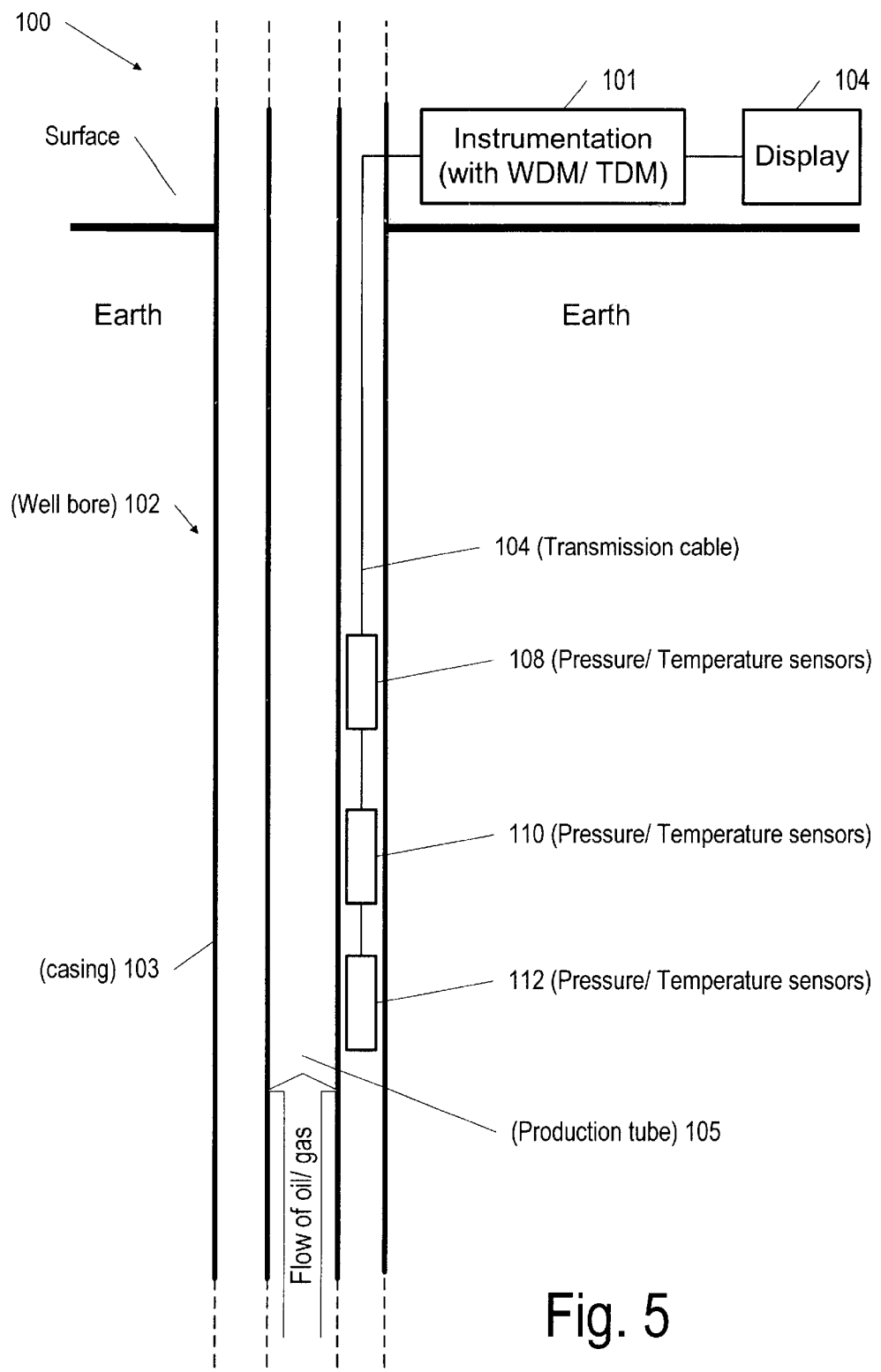
FIG. 5 is a system block diagram/schematic of a single point pressure sensor system in which the present invention could be implemented.

Referring now to FIG. 5, a single point pressure sensor system 100, in which the present invention could be implemented, is shown arranged in relation to a borehole 102 having a casing 103 and a production tube 105, and includes an instrument box 101, a display 104, a transmission cable 106 and pressure and temperature sensors 108, 110, 112 arranged in the borehole 102 to provide sensor signals, via the transmission cable 106, conveying information about the pressure and temperature in the borehole 102. The instrument box 101 and display 104 are typically located on the surface of the borehole 102 and communicate with the pressure and temperature sensors 108, 110, 112 in the borehole 102 using wavelength division multiplexing (WDM) and/or time division multiplexing (TDM). The instrument box 101 is described in greater detail in relation to FIG. 5.

Figure 6:
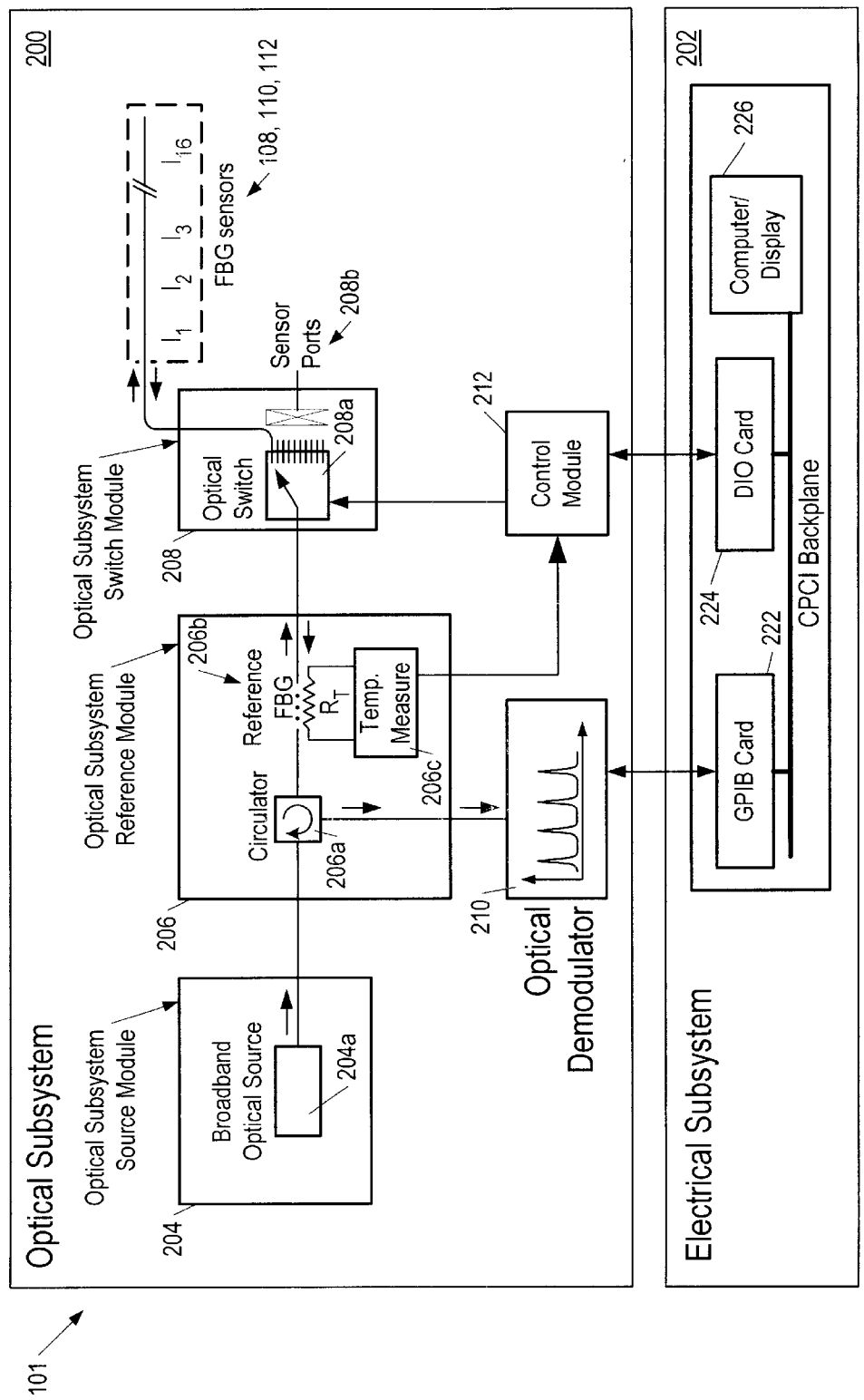
FIG. 6 is a block diagram of the instrument box and the display shown in FIG. 5.

Referring now to FIG. 6, the instrument box 101 is shown as including an optical subsystem 200, for acquiring sensor data and for interpreting the sensed data, and an electrical subsystem 202, for processing the interpreted data and for providing a user interface to the optical subsystem 200. The present invention is implemented in the optical subsystem as a temperature measurement circuit 206c.

The optical subsystem 200 includes source module 204, an optical subsystem reference module 206 including the temperature measurement circuit 206, an optical subsystem switch module 208, an optical demodulator 210 and a control module 212. The pressure and temperature sensors 108, 110, 112 (FIG. 5) are shown as fiber Bragg grating pressure and temperature sensors. The optical demodulator 210 interprets the signals from the pressure and temperature sensors 108, 110, 112 to provide data that can be correlated (by the electrical subsystem) with actual pressure and temperature in the borehole 102. The optical demodulator 210 makes systematic errors in interpreting the sensor data, some of the errors based on the temperature where the optical demodulator is positioned, some based on self-heating of the optical demodulator components, some based on environmental factors and aging. The present invention is used, in one application, to remove the systematic errors made by the optical demodulator 210, by providing a temperature-compensated sensor input from a reference fiber Bragg grating 206b, as described below.

The electrical subsystem 220 includes a general purpose interface bus card (GPIB) 222, a digital input/output card 224 and a computer/display 226 that includes the display 104 (FIG. 4).

The source module 204 of the optical subsystem 200 has an off-the-shelf broadband optical source 204a for providing a super-fluorescent optical source signal for illumination of the fiber Bragg grating pressure and temperature sensors 108, 110, 112 and also a reference fiber Bragg grating 206b, part of the optical subsystem reference module 206.

Besides the reference fiber Bragg grating 206b, the optical subsystem reference module 206 has an off-the-shelf circulator 206a, and a temperature measurement circuit board 206c according to the present invention. The circulator 206a directs the super-fluorescent optical source signal from the broadband optical source 204a via the optical switch 208 to the reference fiber Bragg grating 206b from which the signal continues on to the fiber Bragg grating pressure and temperature sensors 108, 110, 112. The circulator 206a also directs fiber Bragg grating pressure and temperature sensor signals from the fiber Bragg grating pressure and temperature sensors 108, 110, 112 via the optical switch 208 to the optical demodulator 210.

The optical subsystem switch module 208 has an optical switch 208a having sensor ports 208b for receiving signals from the fiber Bragg grating pressure and temperature sensors 108, 110, 112, and for permitting interrogation of the fiber Bragg grating pressure and temperature sensors 108, 110, 112. The optical switch 208a is an off-the-shelf product that provides optical signals to/from the optical subsystem reference module 206 and the fiber Bragg grating pressure and temperature sensors 108, 110, 112, as discussed above.

The optical demodulator 210 is an off-the-shelf product that demodulates the fiber Bragg grating pressure and temperature sensor signals from the fiber Bragg grating pressure and temperature sensors 108, 110, 112, and demodulates the signal received from the reference fiber Bragg grating, and provides demodulated digital signals that are the electrical and digital analogs of the fiber Bragg grating signals, so as to be in a from suitable for input to the general purpose interface bus card (GPIB) 222 of the electrical subsystem 202.

The temperature measurement circuit 206c is a circuit according to the present invention, and is used to measure the temperature of the reference fiber Bragg grating 206b, using a thermistor $R_T$ located so as to sense the same temperature as the reference fiber Bragg grating. (The thermistor $R_T$ of FIG. 5 is the same as the thermistor $R_T$ of the discharge circuit 21 of FIG. 2A, but is shown explicitly, broken out of the temperature measurement circuit 206c, to indicate its being positioned close to the reference fiber Bragg grating 206b.) The temperature measurement circuit 206c provides to the control module 212 a value representing a first length of time and corresponding to the temperature of the reference fiber Bragg grating, and, in turn, a value representing a second length of time and corresponding to the substantially fixed reference resistance $R_R$ included as part of the temperature measurement circuit 206c.

The reference fiber Bragg grating 206b is fabricated to provide a signal to the demodulator 210 which, when compensated for the temperature determined by the temperature measurement circuit 206b, should always be interpreted by an ideal demodulator (i.e. one having no systematic error) as the same interpreted data (i.e. one or more known wavelengths).

The control module 212 determines the temperature-compensated reference wavelength that the optical demodulator 210 should report in demodulating the optical signal corresponding to light reflected from the reference fiber Bragg grating, and provides the temperature-compensated wavelength to the digital input/output card 224 of the electrical subsystem 202. It also provides a channel select signal to the optical switch 208a of the optical subsystem switch module 208 for selectively receiving the fiber Bragg grating pressure and temperature sensor signals provided from the fiber Bragg grating pressure and temperature sensors 108, 110, 112.

In providing the temperature-compensated wavelength the optical demodulator 210 should report based on light reflected from the reference fiber Bragg grating, the control module 212 uses the signals from the temperature measurement board 206c, signals indicating the time for discharge with the thermistor $R_T$ and then with the fixed resistor $R_R$ in the discharge circuit 21 (FIG. 2A), and the known value of the fixed resistor, to figure a value for the thermistor resistance $R_T$, according to equation 1. It then uses a description of how the thermistor resistance varies with temperature to infer the temperature seen by the thermistor, which is also the temperature seen by the reference fiber Bragg grating 206b. Next, it determines what wavelength light, a temperature-corrected reference wavelength, should be reflected from the reference fiber Bragg grating based on the temperature determined from the temperature measurement circuit board 206c. It is the temperature-corrected reference wavelength that the optical demodulator 210 should provide to the electrical subsystem 202, when demodulating the optical signal corresponding to light reflected from the reference fiber Bragg grating, but will not provide because of its systematic error.

In the electrical subsystem 220, the general purpose interface bus card (GPIB) 222 is an off-the-shelf bus card that interfaces the optical demodulator 210 to the computer/display 226 and provides the demodulated digital signals to the computer/display 226.

The digital input/output (DIO) card 224 is an off-the-shelf product that is an interface between the control module 212 and the computer/display 226, and provides control signals from the computer/display 226 to the control module 212, and vice versa, including providing to the computer/display 226 from the control module 212 signals indicating the temperature-compensated reference wavelength. (The computer/display 226 also provides, via the DIO card 224, a select control signal to the control module 212, which uses it to control the optical switch 208, causing the switch to selectively receive the fiber Bragg grating pressure and temperature sensor signals from the fiber Bragg grating pressure and temperature sensors 108, 110, 112.)

The functions of the dynamic compensator 12 of FIG. 2 are, in this particular application, performed by one or more of the following elements: the control module 212, the GPIB card 222, the DIO card 224, and the computer/display 226. The computer/display 226 is a pentium-based computer that processes the raw demodulated digital signals from the optical demodulator 210 to provide processed pressure and temperature signals, containing information about the pressure and temperature in the borehole 102 sensed by the fiber Bragg grating pressure and temperature sensors 108, 110, 112. The computer/display 226 uses signals received from the control module 212 indicating the temperature-compensated reference wavelength to correct all raw demodulated digital signals received from the optical demodulator 210.

It should be understood that the different steps in the correction could just as advantageously be assigned to different components than in the above-described preferred embodiment. For example, the computer/display 226 could calculate the temperature seen by the thermistor (using equation 1), instead of the control module 212 performing that calculation. In some applications both the computer/display 226 and the control module 212 can perform corroborating determinations according to procedures that differ, slightly, in how they arrive at the correction for the optical demodulator 210.

Applications in Which the Compensation Depends on Wavelength

The Michaelson interferometer-based optical demodulator is usually able to be corrected for systematic error by determining how to correct the error at a single wavelength. However, other types of optical demodulators, such as a scanning filter optical demodulator, usually require a correction that varies with wavelength. For such optical demodulators, it is necessary to use as a reference a source of more than one (known) wavelength of light. A single fiber Bragg grating reflects only (substantially) light at a single wavelength. To provide light at several wavelengths suitable for correcting an optical demodulator with systematic error that depends on wavelength, several options are available.

As one option, several reference fiber Bragg gratings can be used, each reflecting light at a different (known) wavelength and so providing a basis for correcting the optical demodulator over the range of the spectrum spanned by the different wavelengths. One implementation of multiple reference fiber Bragg gratings would be to imprint all of the reference fiber Bragg gratings at the same location on the optical fiber in which the sensing fiber Bragg gratings are also imprinted. In such an implementation, the total length of the optical fiber bearing the multiple reference fiber Bragg gratings would be the same, and multiple reference points (wavelengths) could be obtained.

As another option, a Fabry-Perot etalon or a fiber Bragg grating-based resonant cavity can be used in place of the single reference fiber Bragg grating. Unlike the single reference fiber Bragg grating, however, the light used from these devices as a reference for correcting the optical demodulator is transmitted light, not reflected light. But by using optical couplers, for example, a configuration can be devised in which the light from these sources is provided to the optical demodulator along with the light reflected from the sensing fiber Bragg gratings.

The present invention comprehends not only the use of a single reference fiber Bragg grating as a wavelength selector (for providing a single reference wavelength), but also the use of multiple fiber Bragg gratings, a Fabry-Perot etalon, or a fiber Bragg grating-based resonant cavity as a wavelength selector (for providing multiple reference wavelengths), or the use as a wavelength selector of any device that extracts light at known wavelengths from a broadband source by either selective reflection or selective transmission.

Scope of the Invention

It is to be understood that the above-described arrangements are only illustrative of the application of the principles of the present invention. For example, any characteristic of a circuit component can be used as the basis for a measurement according to the present invention, not only resistance, provided that the relationship between the characteristic and temperature is known, and provided that there is another component having a characteristic that is analogous, but independent of temperature. Numerous other modifications and alternative arrangements may be devised by those skilled in the art without departing from the spirit and scope of the present invention, and the appended claims are intended to cover such modifications and arrangements.

What is claimed is:

1. An apparatus for compensating for systematic error in wavelength measurements provided by a wavelength measuring device used for measuring the wavelengths of peaks in a spectrum of light including light from a reference wavelength selector, the apparatus comprising:
    a) a temperature sensing and measuring circuit (11), responsive to a temperature to which the reference wavelength selector is exposed, for measuring the temperature, for providing a signal indicative of the temperature; and
    b) a dynamic compensator (12), responsive to the wavelength measurement signals from the wavelength measuring device, responsive to the signal indicative of the temperature of the reference wavelength selector, and further responsive to a signal indicating a correlation of the true wavelength of light reflected from the reference wavelength selector and the temperature of the reference wavelength selector, for providing dynamic compensator signals indicating information about compensated wavelength measurements, the information about compensated wavelength measurements based on the difference between the true wavelength of light reflected from the reference wavelength selector for the measured temperature of the reference wavelength selector, and the measured wavelength of light reflected from the reference wavelength selector.

2. An apparatus as claimed in claim 1, wherein the temperature sensing and measuring circuit comprises:
    a) a switched sensing circuit having a common set of electrical components and two different electrical components, responsive to the temperature to which the reference wavelength selector is exposed, and further responsive to a detection circuit switch control signal, for providing switched sensing circuit signals containing information about an operating characteristic of the switched sensing circuit using the common set of electrical components switched respectively through each of the two different electrical components; and
    b) a detection circuit, for providing the detection circuit switch control signal, and responsive to the switched sensing circuit signals, for providing a detection circuit signal containing information about the temperature to which the reference wavelength selector is exposed.

3. An apparatus as claimed in claim 2,
    wherein the common set of electrical components includes a capacitor connected in series with a multi-pole switch; and
    wherein the operating characteristic is a time to charge or discharge the capacitor.

4. An apparatus as claimed in claim 3,
    wherein the two different electrical components are a thermistor and a reference resistor;
    wherein the resistance of the thermistor varies with temperature over a known temperature range; and
    wherein the resistance of the reference resistor does not vary substantially with temperature over a range of temperature including the temperature to which the reference wavelength selector is exposed.

5. An apparatus as claimed in claim 2,
    wherein the common set of electrical components includes a capacitor connected in series with a multi-pole switch; and
    wherein the two different electrical components are a thermistor and a reference resistor, each connected in parallel to the multi-pole switch.

6. An apparatus as claimed in claim 5,
    wherein the detection circuit includes a voltage source for providing a voltage source signal; and
    wherein the detection circuit includes a comparator responsive to the switched sensing circuit signals, and further responsive to the voltage source signal, for providing a high or low comparator signal depending on whether voltage of the switched sensing circuit signals is higher or lower than the voltage of the voltage source signal.

7. An apparatus as claimed in claim 6,
    wherein the detection circuit further comprises a clock for providing a clock signal; and
    wherein the detection circuit further comprises a counter responsive to the clock signal, and further responsive to a start/stop signal, for providing a counter signal containing information about the number of pulses of the clock signal.

8. An apparatus as claimed in claim 7,
    wherein the detection circuit includes a circuit controller responsive to the high or low comparator signal, and further responsive to the counter signal, for providing the start/stop signal to the counter, for providing the detection circuit switch control signal to the switched sensing circuit for switching the multi-pole switch, and for providing the detection circuit signal containing information about the temperature to which the reference wavelength selector is exposed.

9. An apparatus as claimed in claim 2,
    wherein the switched sensing circuit includes a resistance-tunable oscillating circuit having a thermistor and a reference resistance and a switch for switching either the thermistor and the reference resistance into the resistance-tunable oscillating circuit, and wherein the operating characteristic is the frequency of the oscillating circuit; and
    wherein the detection circuit detects the resonance frequency of the switched charge or discharge circuit, for providing the detection circuit signal as a measure of the frequency of oscillation of the resistance-tunable oscillating circuit alternately when the thermistor is in the resistance-tunable oscillating circuit and when the reference resistor is in the resistance-tunable oscillating circuit.

10. An apparatus as claimed in claim 1, wherein the reference wavelength selector is selected from the group consisting of a fiber Bragg grating, multiple co-located fiber Bragg gratings, a Fabry-Perot etalon, and a fiber Bragg grating-based resonant cavity.

11. An apparatus for compensating for systematic error in wavelength measurements by a wavelength measuring device used for measuring the wavelengths of peaks in a spectrum of light, the apparatus comprising:

a) a reference wavelength selector (206b), fabricated to reflect light of a pre-determined wavelength when illuminated while at a pre-determined temperature, responsive to illumination from a source of illumination (204a), for reflecting light of a wavelength depending on the temperature to which the reference wavelength selector is exposed;

b) a switched sensing circuit (206c, 21) having a common set of electrical components and two different electrical components, responsive to the temperature to which the reference wavelength selector is exposed, and further responsive to a detection circuit switch control signal, for providing switched sensing circuit signals containing information about an operating characteristic of the switched sensing circuit using the common set of electrical components switched respectively through each of the two different electrical components;

c) a detection circuit (206c, 25), for providing the detection circuit switch control signal, and responsive to the switched sensing circuit signals, for providing a detection circuit signal containing information about the temperature to which the reference wavelength selector is exposed; and d) a processor (212, 12), responsive to the detection circuit signal containing information about the temperature to which the reference wavelength selector is exposed, and further responsive to a data signal indicating a description of how the wavelength of light reflected from the reference wavelength selector varies with temperature; for providing a signal indicated a calculated value corresponding to the wavelength of light reflected by the reference wavelength selector when at the temperature indicated by the sensing circuit.

12. An apparatus as claimed in claim 11, wherein the common set of electrical components includes a capacitor connected in series with a multi-pole switch; and wherein the operating characteristic is a time to charge or discharge the capacitor.

13. An apparatus as claimed in claim 11, wherein the two different electrical components are a thermistor and a reference resistor;

wherein the resistance of the thermistor varies with temperature over a known temperature range; and wherein the resistance of the reference resistor does not vary substantially with temperature over a range of temperature including the temperature to which the reference wavelength selector is exposed.

14. An apparatus as claimed in claim 11, wherein the common set of electrical components includes a capacitor connected in series with a multi-pole switch; and wherein the two different electrical components are a thermistor and a reference resistor, each connected in parallel to the multi-pole switch.

15. An apparatus as claimed in claim 14, wherein the detection circuit includes a voltage source for providing a voltage source signal; and wherein the detection circuit includes a comparator responsive to the switched sensing circuit signals, and further responsive to the voltage source signal, for providing a high or low comparator signal depending on whether voltage of the switched sensing circuit signals is higher or lower than the voltage of the voltage source signal.

16. An apparatus as claimed in claim 15, wherein the detection circuit further comprises a clock for providing a clock signal; and wherein the detection circuit further comprises a counter responsive to the clock signal, and further responsive to a start/stop signal, for providing a counter signal containing information about the number of pulses of the clock signal.

17. An apparatus as claimed in claim 16, wherein the detection circuit includes a circuit controller responsive to the high or low comparator signal, and further responsive to the counter signal, for providing the start/stop signal to the counter, for providing the detection circuit switch control signal to the switched sensing circuit for switching the multi-pole switch, and for providing the detection circuit signal containing information about the temperature to which the reference wavelength selector is exposed.

18. An apparatus as claimed in claim 11, wherein the switched sensing circuit includes a resistance-tunable oscillating circuit having a thermistor and a reference resistance and a switch for switching either the thermistor and the reference resistance into the resistance-tunable oscillating circuit, and wherein the operating characteristic is the frequency of the oscillating circuit; and wherein the detection circuit detects the resonance frequency of the switched charge or discharge circuit, for providing the detection circuit signal as a measure of the frequency of oscillation of the resistance-tunable oscillating circuit alternately when the thermistor is in the resistance-tunable oscillating circuit and when the reference resistor is in the resistance-tunable oscillating circuit.

19. An apparatus as claimed in claim 11, wherein the reference wavelength selector is selected from the group consisting of a fiber Bragg grating, multiple co-located fiber Bragg gratings, a Fabry-Perot etalon, and a fiber Bragg grating-based resonant cavity.

20. A method for compensating for systematic error in wavelength measurements provided by a wavelength measuring device, the wavelength measuring device used for measuring the wavelengths of peaks in a spectrum of light including peaks of light reflected from a reference wavelength selector, the method comprising the steps of:

a) enclosing the reference wavelength selector so as to see substantially a uniform temperature;

b) measuring the temperature;

c) determining the true wavelength of a peak of light reflected by the reference wavelength selector based on the measured temperature and a pre-determined correlation between temperature of the reference wavelength selector and a wavelength of a peak of light reflected by the reference wavelength selector;

d) acquiring the measured wavelength of the peak of light reflected by the reference wavelength selector; and e) determining a correction to be used to compensate the wavelength measuring device for systematic error based on the difference between the measured wavelength of the peak of light reflected from the reference wavelength selector and the true wavelength of the peak of light reflected from the reference wavelength selector.

21. A method as claimed in claim 20, wherein the temperature of the reference wavelength selector is measured using a thermistor disposed so as to sense the same temperature as the reference wavelength selector; wherein a fixed resistor is used, one substantially insensitive to temperature; and wherein the temperature of the reference wavelength selector is measured based on operating characteristics of a circuit involving the thermistor and, in turn, the reference resistor, by switching into the circuit the thermistor and, in turn, the reference resistor, but keeping substantially all other components in the circuit exactly the same.

22. An method as claimed in claim 20, wherein the reference wavelength selector is selected from the group consisting of a fiber Bragg grating, multiple co-located fiber Bragg gratings, a Fabry-Perot etalon, and a fiber Bragg grating-based resonant cavity.

23. An apparatus, comprising:
   a) a wavelength measuring device (14), responsive to a light signal having a spectrum including a peak at a wavelength of light reflected from a reference wavelength selector exposed to a temperature, for providing a signal indicating a measurement of the wavelength of the peak; and
   b) a compensating circuit (10), responsive to the signal indicating the wavelength measurement, and responsive to the temperature to which the reference wavelength selector is exposed, for providing signals indicating values for other wavelength measurements compensated for systematic error made by the wavelength measuring device, wherein the compensating circuit comprises:
      i) a temperature sensing and measuring circuit, responsive to the temperature to which the reference wavelength selector is exposed, for measuring the temperature, for providing a signal indicative of the temperature; and
      ii) a dynamic compensator, responsive to the signal indicative of the wavelength measurement, responsive to the signal indicative of the temperature to which the reference wavelength selector is exposed, and further responsive to a signal indicating a correlation of the true wavelength of light reflected from the reference wavelength selector and the temperature to which the reference wavelength selector is exposed, for providing signals indicating values for other wavelength measurements compensated for systematic error made by the wavelength measuring device, the wavelength measurements being compensated based on the difference between the true wavelength of light reflected from the reference wavelength selector for the measured temperature of the reference wavelength selector, and the measured wavelength of light reflected from the reference wavelength selector.

24. An apparatus as claimed in claim 23, wherein the reference wavelength selector is selected from the group consisting of a fiber Bragg grating, multiple co-located fiber Bragg gratings, a Fabry-Perot etalon, and a fiber Bragg grating-based resonant cavity.

* * * * *

UNITED STATES PATENT AND TRADEMARK OFFICE
CERTIFICATE OF CORRECTION

PATENT NO.     : 6,403,949 B1
DATED          : June 1, 2002
INVENTOR(S)    : Davis et al.

It is certified that error appears in the above-identified patent and that said Letters Patent is hereby corrected as shown below:

Drawings,
Fig. 5, "104 (Transmission cable)" should be -- 106 (Transmission cable) --.

Signed and Sealed this

Fourteenth Day of January, 2003

JAMES E. ROGAN
*Director of the United States Patent and Trademark Office*